July 15, 1969
C. J. TRIBLE ET AL
3,456,088
ELECTROEROSION APPARATUS
Filed Nov. 15, 1965
2 Sheets-Sheet 2
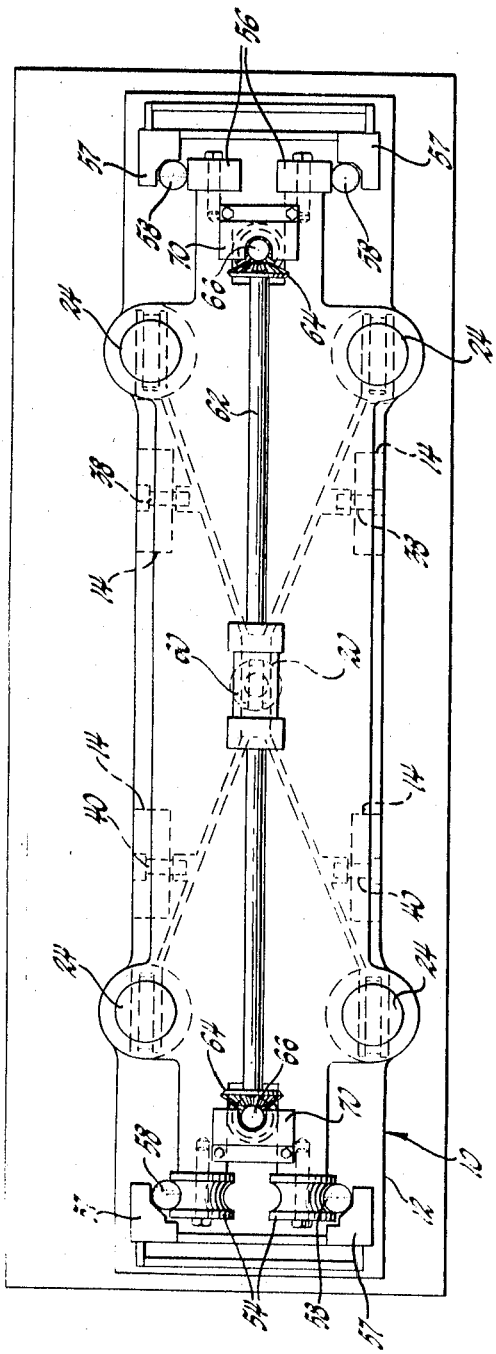
INVENTORS
Clayton J. Trible
William O. Fletcher
Hugh L. Fisher
ATTORNEY United States Patent Office 3,456,088
Patented July 15, 1969

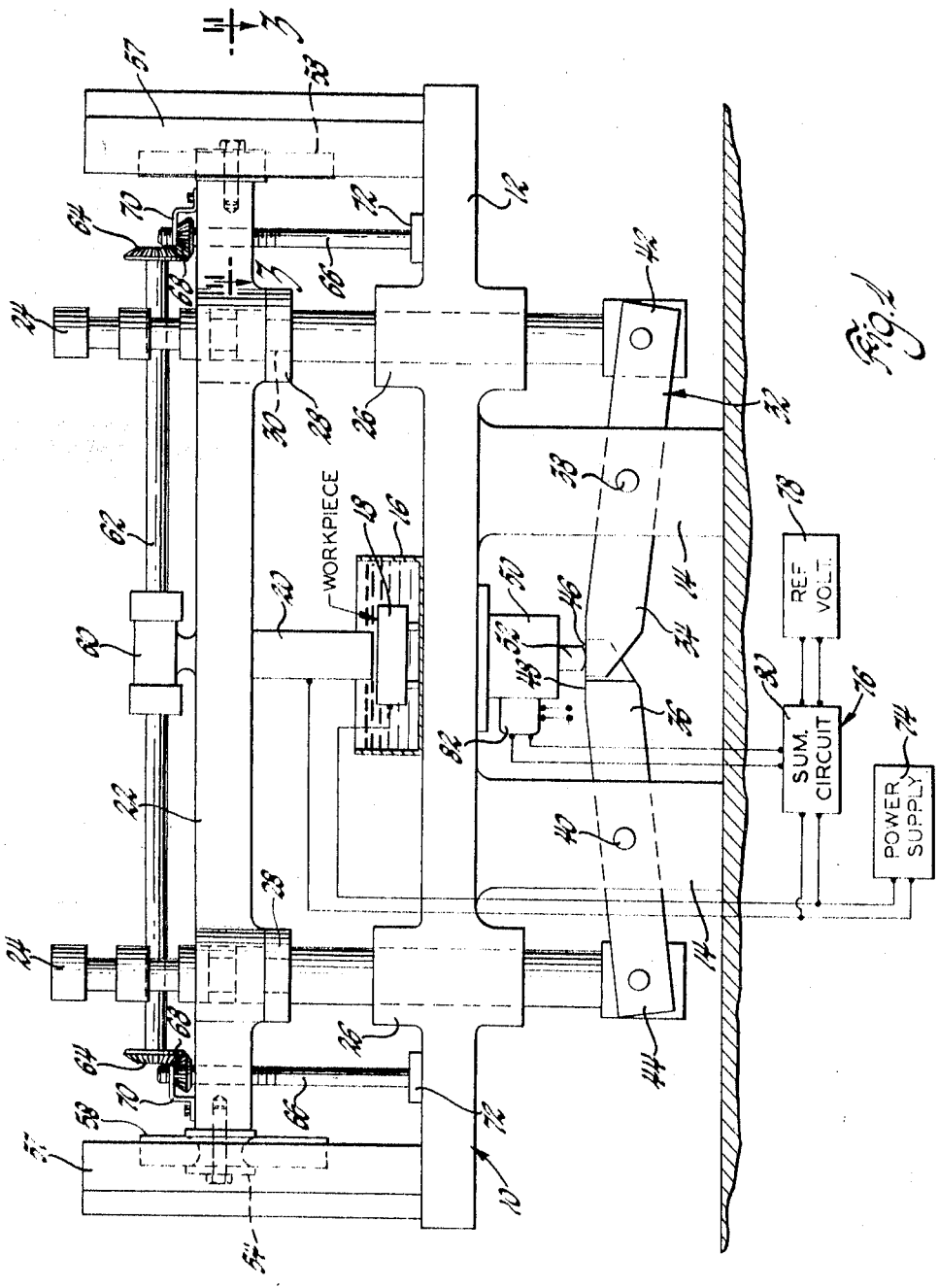

3,456,088
ELECTROEROSION APPARATUS
Clayton J. Trible, Berkley, Mich., and William A. Fletcher, Fort Myers, Fla., assignors to General Motors Corporation, Detroit, Mich., a corporation of Delaware
Filed Nov. 15, 1965, Ser. No. 507,924
Int. Cl. B23k 9/16
U.S. Cl. 219—69    6 Claims

ABSTRACT OF THE DISCLOSURE

Electroerosion apparatus incorporating a vertically movable ram on which is supported a cutting tool. A drive mechanism for the ram employs a motor that, through the agency of two oppositely acting levers, moves the ram up and down on quadrangular spaced posts. A jackscrew provides vertical ram adjustment for different size cutting tools and workpieces. Concave and straight rollers, respectively, prevent lateral and rotational deviations of the ram from its path of movement on the posts.

---

This invention relates to improvements in electrical stock removal apparatus.

Electrical stock removal apparatus, such as that for electrical discharge machining and for electrochemical machining, is sometimes used to machine very large dies that are often both heavy and irregularly shaped. Of course, the cutting tool will be of a complementary configuration. Because the dies or workpieces are expected to be machined to relatively close tolerances, the maneuvering of the cutting tool and the die relative to each other in any precise way presents problems. For example, if the cutting tool is attached to a movable ram, which in turn slides on ways or posts, and the center of gravity of the cutting tool and the ram do not coincide, there will be a bending moment, which will be transferred to the ways or posts. These bending moments not only produce excessive stresses where the loads are heavy, but because of the tendency for a binding to occur due to the unequal imposition of tilt inducing loads on the different posts or ways, feed becomes erratic rendering any accurate duplication of the cutting tool very difficult.

Accordingly, novel electrical stock removal apparatus is proposed overcoming the foregoing problems by a unique arrangement including provision for facilitating the maintenance of parallelism between the relatively movable supporting structures for the electrodes. This is done while avoiding complexity and cumbersome, complicated equipment. More specifically, the movable structure is joined to posts, which are slidably supported by the fixed structure such that the bending forces are avoided. Also, the apparatus incorporates a unique guidance provision for inhibiting deviations of the movable structure from a predetermined path and an adjustable feature that permits the apparatus to accommodate many different and diverse sizes of dies and workpieces, thus further enhancing the versatility of the novel apparatus.

The foregoing and other objects and advantages of the invention will become apparent from the following description and from the accompanying drawings, in which:

FIGURE 1 is a front elevational view of electrical stock removal apparatus illustrated schematically and incorporating the principles of the invention;

FIGURE 2 is a top plan view of the FIGURE 1 apparatus; and

FIGURE 3 is a fragmentary sectional view of a part of the apparatus taken along the line 3—3 in FIGURE 1.

Referring now to the drawings in detail and initially to FIGURE 1, the numeral 10 denotes generally a base formed with a platform 12 supported on four legs 14. The legs 14 are arranged as illustrated in FIGURE 2. This base 10 has mounted on the platform 12 a tank 16 supplied in any appropriate way with a machining fluid. For demonstration purposes only, it will be assumed that the electrical discharge machining process is to be carried out by the FIGURE 1 apparatus and, therefore, the tank 16 will have supplied thereto a suitable dielectric fluid. Mounted within the tank 16 and insulated therefrom is a conductive electrode, which will be referred to as a workpiece 18. Directly opposite this workpiece 18 is another conductive electrode, which will be referred to as a cutting tool 20. The cutting tool 20 is secured in any conventional way to a ram 22.

The ram 22 is supported upon the upper end of four vertical posts 24. These posts 24 are quadrangularly related so as to define a rectangular area, as is best shown in FIGURE 2. Note that the cutting tool 20 is positioned within this rectangular area. The reason for this will be subsequently explained further. The posts 24 are each journaled within bosses 26, which are a part of the base platform 12. The ram 22 is, in the FIGURE 1 embodiment, supported upon the upper end of the posts 24 by C-shaped clamps 28 that fit within notches or reduced diameter portions 30 provided in the posts 24. The ram 22, of course, can be joined to the posts 24 in other ways, as will readily occur to those versed in the art. Because the weight of the ram 22 maintains the ram 22 in engagement with the C-shaped clamps 28, any further attachment is generally not needed.

The posts 24 and, accordingly, the ram 22 are maneuvered up and down by a drive mechanism designated generally at 32. The drive mechanism 32 includes two oppositely acting levers 34 and 36. These levers 34 and 36 are each pivotally supported between their ends respectively at 38 and 40 by the base legs 14. As best shown in FIGURE 2 the levers 34 and 36 are V-shaped and have their ends, such as ends 42 of the lever 34 and ends 44 of the lever 36, bifurcated and slidably attached to the bottom of the posts 24 on their respective sides of the base 10. The opposite ends of the levers 34 and 36 are respectively provided with drive surfaces 46 and 48. These drive surfaces 46 and 48 are adjacent each other and are illustrated in FIGURE 1 as being in embracing relation. This relationship can, of course, be varied and will be determined by the application of the apparatus.

When a downward force, as viewed in FIGURE 1, is exerted upon the drive surfaces 46 and 48, the levers 34 and 36 will together rotate about their respective axes 38 and 40 in counterclockwise and clockwise directions. Consequently, the posts 24 are moved upwardly and carry therewith the ram 22. The distances from the drive surfaces 46 and 48 to the pivot points 38 and 40, and from the pivot points 38 and 40 to where the bifurcated ends 42 and 44 are pivotally attached to the posts 24 will, of course, determine the lever ratio. This lever ratio, which determines the downward force required to move the ram 22 upwardly against the force of gravity exerted because of the mass of the ram 22, can be varied considerably. In the FIGURE 1 embodiment the lever ratio is substantially 1:1.

The downward force exerted on the levers 34 and 36 is provided by a motor, designated by the numeral 50. Any suitable type of motor can be used for this purpose. The motor illustrated is a fluid pressure actuated motor of the piston type having a piston rod 52 extending therefrom into engagement with the drive surfaces 46 and 48. The end of the piston rod 52 is portrayed as arcuate, but if preferred a suitable roller attached to the end of the piston rod 52 can be substituted.

Upon fluid pressure actuation of the motor 50 the piston rod 52 will be urged downwardly into engagement with the drive surfaces 46 and 48 and produce the mentioned rotation of the levers 34 and 36. When the fluid pressure actuation of the motor 50 is reduced, the weight of the ram 22 will urge the posts downwardly and, thus the levers 34 and 36 will now rotate respectively in clockwise and counterclockwise directions, causing the rod 52 to be moved upwardly or retracted.

As will now be appreciated, with the cutting tool 20 having its center of gravity offset with respect to the center of gravity of the ram 22 but within the area defined by the four posts 24, there will not be a bending moment, but the forces will all be downward. The foregoing is probably best demonstrated by a four-legged support, such as some kind of table, for a load. As long as the load is within the area defined by the four legs the table will not tilt. Of course, one or more of the legs may be required to support a major part of the load, but this results in a compressive load only.

The arrangement of the four posts 24 need not define a rectangular area. Other areas are possible. Also, in some applications three posts may be used or even two if the load can be properly orientated relative to these two posts.

As the posts 24 and the ram 22 are moved up and down there is the possibility of sidewise or lateral movement of the ram 22, and also there can be a tendency for the entire ram 22 to rotate. These lateral and rotational tendencies can be due to permitted manufacturing tolerances, and their influence further aggravated by offset loads; i.e., the center of gravity of the cutting tool 20 is offset from the center of gravity of the ram 22. To restrict these tendencies a set of concave rollers 54 and a set of straight rollers 56 are journaled on opposite ends of the ram 22, as best illustrated in FIGURE 2. The concave rollers 54 and the straight rollers 56 engage guideways provided by round shafts 58 which are each vertically arranged on and secured to upright columns 57 extending from the base platform 12. The set of rollers 54 being concave, embrace the round shafts 58 and thus inhibit any tendency for the ram 22 to move sidewise. The straight rollers 56, also shown in FIGURE 3, discourage any tendency for the ram 22 to rotate because of their engagement with the insides of round shafts 58, as viewed in FIGURE 2. Then too, the straight rollers 56 allow for expansion and contraction.

It has been mentioned that the ram 22 is adjustable on the ends of the posts 24, i.e., the ram 22 can be moved upwardly from the position demonstrated in FIGURE 1 until the C-shaped clamps 28 can be inserted within one of the notches 30. This raising of the ram 22, of course, permits different shaped workpieces 18 and also different shaped cutting tools 20 to be accommodated by the apparatus merely by varying the operational distance between the base platform 12 and the ram 22. The raising and lowering of the ram 22 is achieved by a suitable motor 60 shown mounted on top of the ram 22. The motor 60 drives an elongated shaft 62, which through identical bevel gearing 64 at each end rotates vertical jackshafts 66. These jackshafts 66 are threadedly joined to pinions 68, which are rotatably secured to the ram 22; e.g., by brackets 70.

To make an adjustment, the motor 60 is activated to rotate the elongated shaft 62 and correspondingly the pinions 68 in the proper direction to move the jackshafts 66 downwardly into engagement with stops 72 on the base platform 12. The pinions 68 being restrained from any movement relative to the ram 22 other than rotation, functions as a nut and hence the jackshafts 66 must move axially with respect thereto, keeping in mind that the jackshaft and pinion sets on each side have opposite hand threads so that the jackshafts 66 will always move in the same axial direction. If the single elongated shaft 62 is formed into two oppositely rotating shafts, the same hand threads, of course, can be used. Once the jackshafts 66 engage the stops 72, the ram 22 will be forced upwardly since the jackshafts 66 cannot move any further downwardly. Consequently, the load on the C-shaped clamps 28 is relieved, and the C-shaped clamps 28 can be removed and inserted into whatever next notch 30 corresponds to the desired elevation of the ram 22. The rotational direction of the motor 60 is now reversed and the jackshafts 66 advance upwardly permitting the ram 22 to descend into engagement again with the C-shaped clamps 28. The advance upwardly of the jackshafts 66 is continued after the engagement to insure that they are an adequate distance from the stops 72 to accommodate the expected descent required for the ram 22 during the machining of the workpiece 18. The motor 60 is then stopped.

If, as mentioned, the apparatus is to be utilized for carrying out the electrical discharge machining process, an appropriate power supply 74 is connected across the gap formed between the workpiece 18 and the cutting tool 20. The power supply 74 supplies thereto pulsating energy that will produce with the proper gap spacing electrical discharges across the dielectric fluid-filled gap. These discharges cause stock to be eroded from the workpiece 18 in a well known way. While the machining is occurring, a gap spacing control system, denoted generally by the numeral 76, continuously senses the voltage across the gap and compares it with a reference voltage from a source 78. This comparison is made by a summing circuit 80 of a known type, and if the gap voltage is different then the desired reference voltage corresponding to the preferred gap spacing an error signal will be developed and supplied to a conventional force motor 82 which controls the supply of fluid pressure to the motor 50. The power supply 74 and the spacing control system 76 may be as disclosed in the Colten et al. Patent 3,059,150 and reference may be made thereto if more information relative to details is wanted.

With the foregoing control system 76, if the machining is occurring too fast the gap spacing will reduce and the reference voltage 78 will dominate. The corresponding error signal will then cause the force motor 82 to increase the pressure of the fluid supplied to the motor 50. As a consequence, the piston rod 52 will exert a greater force on the driving surfaces 46 and 48 and retard or slow up the downward feed of the ram 22. This downward force exerted by the piston rod 52 merely counteracts the weight of the ram 22 inasmuch as a gravity feed is utilized with the FIGURE 1 arrangement.

Briefly summarizing the operation of the apparatus, the motor 60 is initially operated in the foregoing described way to raise or lower the ram 22 with respect to the base platform 12 until the spacing therebetween is adequate to accommodate the workpiece 18 and the cutting tool 20. Then the C-shaped clamps 28 are inserted within the corresponding notches or reduced diameter portions 30 of each of the posts 24 and the ram 22 allowed to descend until the weight of the ram 22 is supported entirely by the C-shaped clamps 28 and the posts 24. Next, the workpiece 18 and the cutting tool 20 are respectively joined to the tank 16 on the base platform 12 and the ram 22. Now the power supply 74 is turned on to commence the machining, assuming that initially the desired gap spacing has been established. The gap spacing control circuit 76 immediately becomes effective and gradually the pressure supplied by the force motor 82 to the motor 50 is allowed to diminish so that the levers 34 and 36 are allowed to be rotated respectively in their clockwise and counterclockwise directions by the mass of the ram 22. In the meantime the set of concave rollers 54 prevent any lateral deviations of the ram 22 while the set of straight rollers 56 prevent any rotational deviations of the ram 22 from its rectilinear path until the workpiece 18 is machined to a desired shape. At this time the ram 22 and, correspondingly, the cutting tool 20 can be retracted merely by adjusting the voltage from the reference source 78 so as to increase the pressure of the fluid supplied by the force motor 82 to the motor 50.

Piston rod 52 will consequently be moved downwardly and rotate the levers 34 and 36, respectively, in their counterclockwise and clockwise directions until the space between the ram 22 and the base platform 12 is adequate to permit the operator to remove the workpiece 18 and also the cutting tool 20 if necessary. A new workpiece 18 is inserted and the operation recommenced.

As will be appreciated from the foregoing, only downward forces are exerted upon the ram 22 as long as the center of gravity of the cutting tool 20 is within the area defined by the posts 24. Thus, only compressive forces are exerted and not bending forces, which tend to cause the feed mechanism to jam or bind and, therefore, advance erratically, which in some instances could even result in erratic forming of the workpiece 18 or even damage to either or both the workpiece 18 and the cutting tool 20. Further enhancing the maintenance of the parallelism of the ram 22 are the guides furnished by the set of concave rollers 54 and the straight rollers 56. The apparatus also utilizes gravity for feed purposes. Furthermore, if the ram 22 needs to be adjusted on the posts 24, this is easily done by the motor 60 and the jackshafts 72.

It should be appreciated that the described structure is only exemplary and that the inventive concepts can be accomplished by other structure as will readily occur to those versed in the art.

The invention is to be limited only by the following claims.

What is claimed is:

1. Apparatus for electrically removing stock from a conductive workpiece electrode with power supplied to a gap formed between the workpiece electrode and a conductive tool electrode comprising a base for supporting one of the electrodes, a plurality of spaced apart posts slidably and guidably supported by the base, a ram joined to the posts and supporting the other of the electrodes between the posts, drive mechanism for conjointly maneuvering the posts and accordingly the ram relative to the base, the drive mechanism including a pair of levers each having a driving surface thereon, each lever being joined to an opposite side of the base for pivotal movement thereon about spaced axes and also each being joined to one of the posts so that the driving surfaces are proximate each other, guide means carried by the base and including lateral motion restricting rotative guides and rotational motion restricting rotative guides together coacting between the ram and the base to restrict respectively lateral and rotational deviations of the ram from a rectilinear path, motor means drive-related to the driving surfaces so that when operative the pair of levers are caused to pivot in opposite directions so as to maneuver the ram relative to the base, and a power supply connected across the gap.

2. Apparatus for electrically removing stock from a conductive workpiece electrode with power supplied to a gap formed between the workpiece electrode and a conductive tool electrode comprising a base for supporting one of the electrodes, a plurality of spaced apart posts slidably and guidably supported by the base, a ram joined to the posts and supporting the other of the electrodes between the posts, drive mechanism for conjointly maneuvering the posts and accordingly the ram relative to the base, roller guide means carried by the base for restricting both lateral and rotational deviations of the ram along a certain path, the roller guide means including lateral motion restricting arcuate rollers and rotational motion restricting rollers together coacting between the ram and the base, and a power supply connected across the gap.

3. Apparatus for electrically removing stock from a conductive workpiece electrode with power supplied to a gap formed between the workpiece electrode and a conductive tool electrode comprising a base for supporting one of the electrodes, a plurality of spaced apart posts slidably and guidably supported by the base, a ram joined to the posts and supporting the other of the electrodes between the posts, drive mechanism for conjointly maneuvering the posts and accordingly the ram relative to the base, the drive mechanism including a pair of oppositely acting levers pivotally joined to the base and individually drive-connected each to one of the posts, motor means operative to pivot the levers and thereby cause the posts to be maneuvered, roller guide means carried by the base and including lateral motion restricting arcuate rollers and rotational motion restricting rollers together coacting between the ram and the base for restricting respectively lateral and rotational deviations of the ram from a rectilinear path, and means adjusting the position of the ram on the post, the adjusting means including a jackscrew arranged to move the ram relative to the base.

4. Apparatus for electrically removing stock from a conductive workpiece electrode with power supplied to a gap formed between the workpiece electrode and a conductive tool electrode comprising a base for supporting one of the electrodes, four vertical posts slidably and guidably supported between the end thereof in quadrangular spaced relation by the base, a ram joined to the upper ends of the posts and supporting the other of the electrodes between the posts and within the quadrangle defined by the posts, drive mechanism for conjointly maneuvering the posts and accordingly the ram vertically along a rectilinear path relative to the base, the drive mechanism including motor means and a pair of oppositely acting levers pivotally joined between the ends thereof to the base, each lever having one end thereof joined to two of the posts and also having at the other end thereof a driving connection with the motor means so that when the motor means is operative the posts are maneuvered up and down relative to the base, roller guide means carried by the base and including lateral motion restricting rollers and rotational motion restricting rollers together coacting between the ram and the base for restricting respectively lateral and rotational deviations of the ram from the rectilinear path, and a power supply connected across the gap.

5. Apparatus for electrically removing stock from a conductive workpiece electrode with power supplied to a gap formed between the workpiece electrode and a conductive tool electrode comprising a base for supporting one of the electrodes, four vertical posts slidably and guidably supported between the ends thereof in quadrangular spaced relation by the base, a ram joined to the upper ends of the posts and supporting the other of the electrodes between the posts and within the quadrangle defined by the posts, drive mechanism for conjointly maneuvering the posts and accordingly the ram vertically along a rectilinear path relative to the base, guide means carried by the case for restricting both lateral and rotational deviations of the ram from the rectilinear path, the guide means including lateral motion restricting concave rollers and rotational motion restricting straight rollers, all revolvably supported on the base and arranged to engage adjacent complementary surfaces on the ram.

6. Apparatus for electrically removing stock from a conductive workpiece electrode with power supplied to a gap formed between the workpiece electrode and a conductive tool electrode comprising a base for supporting one of the electrodes; four vertical posts slidably and guidably supported between the ends thereof in quadrangular spaced relation by the base; a ram joined to the upper ends of the posts and supporting the other of the electrodes between the posts and within the quadrangle defined by the posts, drive mechanism for conjointly maneuvering the posts and accordingly the ram vertically along a rectilinear path relative to the base; the drive mechanism including a pair of levers each having a driving surface thereon, each lever being joined between the ends thereof to an opposite side of the base for pivotal movement thereon about spaced axes and also each being joined to two of the posts at the other ends thereof so that the driving surfaces are proximate each other and motor means drive-related to the driving surface so that when operative the pair of levers pivot in opposite directions to maneuver the ram up and down on the base; guide means carried by the base for restricting both lateral and rotational deviations of the ram from the rectilinear path; the guide means including lateral motion restricting concave rollers and rotational motion restricting straight rollers all revolvably supported on the base and arranged to engage adjacent complimentary surfaces on the ram; means adjusting the position of the ram on the post, the adjusting means including a jackscrew arranged to move the ram relative to the base; a power supply connected across the gap; and means rendering the motor means operative in response to a characteristic of the power across the gap.

References Cited

UNITED STATES PATENTS

| | | | |
|---|---|---|---|
| 1,008,528 | 11/1911 | Cruse | 100—271 X |
| 1,073,831 | 9/1913 | Wilson | 100—271 |
| 1,422,014 | 7/1922 | White | 100—271 X |
| 1,861,011 | 5/1932 | Holmes | 219—101 |
| 2,981,822 | 4/1961 | Larkins. | |

ANTHONY BARTIS, Primary Examiner

R. F. STAUBLY, Assistant Examiner

U.S. Cl. X.R.

100—257, 271